(12) United States Patent
Ouchi (10) Patent No.: US 6,226,096 B1
(45) Date of Patent: *May 1, 2001

(54) IMAGE INPUT/OUTPUT SYSTEM AND MULTI-FUNCTION PERIPHERAL APPARATUS INCORPORATING THE SAME

(75) Inventor: Tetsuya Ouchi, Tajimi (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,050

(22) Filed: Sep. 19, 1997

(30) Foreign Application Priority Data

Sep. 19, 1996 (JP) .................................... 8-248412

(51) Int. Cl.⁷ ........................................ B41B 1/00
(52) U.S. Cl. ............................................ 358/1.14
(58) Field of Search .................. 395/112–114, 185.1, 395/185.01; 710/15–17, 19; 358/1.13–1.15

(56) References Cited

U.S. PATENT DOCUMENTS

| | | | | |
|---|---|---|---|---|
| 4,179,732 | * | 12/1979 | Khan et al. ............... | 364/200 |
| 4,947,345 | * | 8/1990 | Paradise et al. .......... | 358/442 |
| 5,021,892 | * | 6/1991 | Kita et al. ................ | 358/468 |
| 5,072,303 | * | 12/1991 | Silverberg ................ | 358/296 |
| 5,115,374 | * | 5/1992 | Hongoh .................... | 361/681 |
| 5,200,958 | * | 4/1993 | Hamilton et al. .......... | 371/16.4 |
| 5,206,735 | * | 4/1993 | Gauronski et al. ......... | 358/296 |
| 5,361,134 | * | 11/1994 | Hu et al. .................. | 358/296 |
| 5,459,579 | * | 10/1995 | Hu et al. .................. | 358/296 |
| 5,467,449 | * | 11/1995 | Gauronski et al. ......... | 395/185 |
| 5,530,554 | * | 6/1996 | Maehara ................... | 358/296 |
| 5,565,964 | * | 10/1996 | Tashiro et al. ............ | 355/210 |
| 5,673,190 | * | 9/1997 | Kahlek ..................... | 364/131 |
| 5,859,956 | * | 1/1999 | Sugiyama et al. ......... | 358/1.13 |
| 5,920,405 | * | 7/1999 | McIntyre et al. .......... | 358/442 |

OTHER PUBLICATIONS

Jantz, Richard, "Print it, Fax it, Scan it, Copy it", PC World, v10, n11, pp. 48–49, Nov. 1992.*

Trembly, Ara, "Multifunctionality: A Concept in Search of Identity", Managing Office Technology, pp. 11–12, Jun. 30, 1994.*

* cited by examiner

Primary Examiner—Amelia Au
Assistant Examiner—Martin Miller
(74) Attorney, Agent, or Firm—Oliff & Berridge, PLC (57) ABSTRACT

In an image input/output system, a personal computer (PC) and a multi-function peripheral apparatus, containing a scanner device and a printer device, are connected by a single cable via respective parallel interfaces. If a detector device of the multi-function peripheral apparatus detects an error in the scanner device or the printer device, the multi-function peripheral apparatus transmits error information to the PC via the parallel interfaces. Despite the error in the printer or scanner device, the PC is able to output an ordinary operation instruction to the device that is free from the error. In accordance with such an instruction, the multi-function peripheral apparatus exchanges information or data with the PC, thereby allowing the device that has no error to operate normally.

9 Claims, 8 Drawing Sheets

IMAGE INPUT/OUTPUT SYSTEM AND MULTI-FUNCTION PERIPHERAL APPARATUS INCORPORATING THE SAME

BACKGROUND OF THE INVENTION

1. Field of Invention

The present invention relates to an image input/output system for use in multi-function peripheral apparatus, such as a peripheral apparatus incorporating a scanner device and a printer device.

2. Description of Related Art

Peripheral apparatus are available for inputting an image to a host apparatus, such as a personal computer, or for outputting an image displayed by the host apparatus. For example, image scanners are used to read an image of a photograph, a text document or the like, and output the corresponding image data. Printers are used to print character data or image data output by host apparatus.

Conventional peripheral apparatus, such as printers and scanners, are separately connected to a host apparatus. Separate cables are used to connect an input/output (I/O) port of the scanner to an I/O port provided for a scanner in the host apparatus, and an I/O port of the printer to a printer I/O port of the host apparatus.

However, recently commercialized multi-function peripheral apparatus are capable of being connected to a host apparatus through a single cable. The multi-function peripheral apparatus can perform the function of two or more peripheral apparatus, e.g., a scanner device and a printer device.

Such a multi-function peripheral apparatus allows a user to have both a scanner device and a printer device, even if the installation space is limited, and facilitates connection to a host apparatus, since only one connecting cable is required.

However, in a system incorporating such a multi-function peripheral apparatus, if an error, e.g., a paper jam, occurs in the printer device, data transmission from the host apparatus to the printer device is rejected. In such a case, the multi-function peripheral apparatus outputs a busy signal to the host apparatus to switch off communication between the host apparatus and the multi-function peripheral apparatus. As a result, communication between the scanner device and the host apparatus is also switched off.

That is, if an error occurs in the printer device of a multi-function peripheral apparatus, the scanner device also becomes unusable, even if it has no operational problem. This impedes the efficient use of the multi-function peripheral apparatus.

Likewise, in a multi-function peripheral apparatus incorporating a sheet-feed-type scanner device, if an error, e.g., a document sheet jam, occurs in the scanner device, a busy signal is output to the host apparatus to switch off communication between the host apparatus and the multi-function peripheral apparatus. Therefore, the printer device in the multi-function peripheral apparatus also becomes unusable even though the printer device has no operational problem.

SUMMARY OF THE INVENTION

Accordingly, it is an object of the present invention to provide an image input/output system wherein, if an error occurs in either a scanner device or a printer device of a multi-function peripheral apparatus, the other device can still be operated. A multi-function peripheral apparatus that incorporates the image input/output system of this invention is also provided.

According to one aspect of the present invention, an image input/output system is provided that comprises a multi-function peripheral apparatus, and a host apparatus for bi-directional communication with the multi-function peripheral apparatus. The multi-function peripheral apparatus comprises, in a single body, a scanner device for reading an image from a document, and an image forming device.

The multi-function peripheral apparatus further comprises a detection device for detecting an error in at least one of the scanner device and the image forming device, and a single I/O port provided for both the scanner device and the image forming device. The multi-function peripheral apparatus also comprises a transmission-reception device for transmitting to the host apparatus, via the I/O port, information regarding an error detected by the detection device, and data read by the scanner device.

The transmission-reception device also receives information and data from the host apparatus. The transmission-reception device transmits and receives information and data in accordance with an instruction from the host apparatus, even if error information has been transmitted to the host apparatus. Further, a control device is provided for controlling operation of the scanner device and operation of the image forming device on the basis of information from the transmission-reception device. The host apparatus includes an instruction device for instructing the multi-function peripheral apparatus to start a scanning operation or an image forming operation, and an I/O port connected to the I/O port of the multi-function peripheral apparatus.

The host apparatus further includes a transmission-reception device for receiving, via the I/O port, information and data from the multi-function peripheral apparatus, and transmitting information and data to the multi-function peripheral apparatus. The transmission-reception device of the host apparatus is set so that if error information is received, the transmission-reception device suspends transmission of information and data related to the device identified by the error information. However, the transmission reception device still performs transmission and reception of information and data related to the device that is still functioning.

If an error is detected in the image forming device by the detection device of the multi-function peripheral apparatus, error information regarding the image forming device is transmitted to the host apparatus by the transmission-reception device of the multi-function peripheral apparatus. Based on the error information, the transmission-reception device of the host apparatus suspends transmission of information and data to the image forming device, but remains able to transmit information and data to the functioning scanner device, in accordance with an instruction from the instruction device. The transmission-reception device of the multi-function peripheral apparatus remains able to perform transmission and reception of information and data in accordance with the instruction from the host apparatus, even after transmitting the error information to the host apparatus. Therefore, when the host apparatus transmits scanning information and data, the scanner device reads an image from a document, in accordance with the instruction from the host apparatus, and the read data is transmitted to the host apparatus.

If an error is detected in the scanner device by the detection device, error information regarding the scanner device is transmitted to the host apparatus by the transmission-reception device of the multi-function peripheral apparatus. Based on the error information, the transmission-reception device of the host apparatus suspends transmission of information and data to the scanner device, but remains able to transmit information and data to the functioning image forming device, in accordance with an instruction from the instruction device. The transmission-reception device of the multi-function peripheral apparatus remains able to perform transmission and reception of information and data, in accordance with the instruction from the host apparatus, even after transmitting the error information to the host apparatus. Therefore, when the host apparatus transmits image forming information and data, the image forming device operates normally to form an image in accordance with the instruction from the host apparatus.

In short, even if there is an error in either the scanner device or the image forming device, information and data related to the functioning device can be transmitted and received between the host apparatus and the multi-function peripheral apparatus, thereby enabling the functioning device to operate normally. Therefore, this construction enables efficient use of the image input/output system made up of the host apparatus and the multi-function peripheral apparatus having a single I/O port.

According to another aspect of the present invention, there is provided an image input/output system comprising a multi-function peripheral apparatus, and a host apparatus for bi-directional communication with the multi-function peripheral apparatus. The multi-function peripheral apparatus comprises, in a single body, a scanner device for reading an image from a document, and an image forming device.

The multi-function peripheral apparatus further comprises a detection device for detecting an error in the multi-function peripheral apparatus, a single I/O port provided for both the scanner device and the image forming device, and a transmission-reception device for transmitting information, via the I/O port, regarding an error detected by the detection device and data read by the scanner device to the host apparatus, and for receiving information and data from the host apparatus. The transmission-reception device allows reception of a document reading request signal for the scanner device from the host apparatus, and transmits data read by the scanner device to the host apparatus even if error information has been transmitted to the host apparatus.

Further, a control device is provided for controlling operation of the scanner device and operation of the image forming device on the basis of information from the transmission-reception device. The host apparatus comprises an instruction device for instructing the multi-function peripheral apparatus to start a scanning operation or an image forming operation, and an I/O port connected to the I/O port of the multi-function peripheral apparatus. The host apparatus further comprises a transmission-reception device for receiving, via the I/O port, information and data from the multi-function peripheral apparatus, and for transmitting information and data to the multi-function peripheral apparatus. The transmission-reception device of the host apparatus is set so that if error information related to the image forming device is received, the transmission-reception device suspends transmission of information and data related to the image forming device but, in accordance with a document reading request from the instruction device, transmits the document reading request signal for the scanner device and receives data read by the scanner device from the multi-function peripheral apparatus.

If an error is detected in the image forming device by the detection device of the multi-function peripheral apparatus, error information regarding the image forming device is transmitted to the host apparatus by the transmission-reception device of the multi-function peripheral apparatus. Based on the error information, the transmission-reception device of the host apparatus suspends transmission of information and data for the image forming device, but remains able to transmit information and data to the functioning scanner device, in accordance with an instruction from the instruction device. The transmission-reception device of the multi-function peripheral apparatus remains able to perform transmission and reception of information and data in accordance with the instruction from the host apparatus, even after transmitting the error information to the host apparatus. Therefore, when the host apparatus transmits scanning information and data, the scanner device reads an image from a document in accordance with the instruction from the host apparatus, and the read data is transmitted to the host apparatus. In this manner, even if an error occurs in the image forming device, the scanner device can be operated normally, since the scanner device is not affected by the error. Therefore, the transmission and reception of information and data related to the scanner device between the multi-function peripheral apparatus and the host apparatus remains possible. Thus, this construction also enables efficient use of the image input/output system made up by the host apparatus and the multi-function peripheral apparatus having a single I/O port.

When an error occurs in the above-described image input/output systems, the transmission-reception device of the multi-function peripheral apparatus may transmit the content of the error as the error information, and the host apparatus may further comprise a display device, that is separate from the instruction device, for displaying the content of the error.

If an error is detected by the detection device of the multi-function peripheral apparatus, the transmission-reception device transmits error information to the host apparatus, including information regarding the occurrence of the error and information regarding the content of the error, and the content of the error is displayed by the display device of the host apparatus. Thus, a user is advised to take an appropriate action and the user is informed of the operable device or function of the multi-function peripheral apparatus. The error information may further include information as to whether or not there is an error. The operable device may be indicated by, for example, displaying the location of the error. Thus, it becomes possible to more efficiently use the image input/output system made up by the host apparatus and the multi-function peripheral apparatus having a single I/O port.

According to still another aspect of the present invention, there is provided a multi-function peripheral apparatus having, in a single body, a scanner device for reading an image from a document, and an image forming device, and that performs bi-directional communication with a host apparatus. The multi-function peripheral apparatus further comprises a detection device for detecting an error in at least one of the scanner device and the image forming device, and a single I/O port provided for both the scanner device and the image forming device.

The multi-function peripheral apparatus also comprises a transmission-reception device for transmitting, via the I/O port, information regarding an error detected by the detection device and data read by the scanner device to the host apparatus, and for receiving information and data from the host apparatus. The transmission-reception device transmits and receives information and data in accordance with an instruction from the host apparatus, even if error information has been transmitted to the host apparatus. Further, a control device is provided for controlling operation of the scanner device and operation of the image forming device on the basis of information from the transmission-reception device.

If an error is detected in the image forming device by the detection device of the multi-function peripheral apparatus, error information regarding the image forming device is transmitted to the host apparatus by the transmission-reception device of the multi-function peripheral apparatus. Based on the error information, a transmission-reception device of the host apparatus suspends transmission of information and data to the image forming device. The transmission-reception device of the multi-function peripheral apparatus remains able to perform transmission and reception of information and data, in accordance with an instruction from the host apparatus, even after transmitting the error information to the host apparatus. Therefore, when the host apparatus transmits information and data for the functioning scanner device, the scanner device reads an image from a document in accordance with the instruction from the host apparatus, and the read data is transmitted to the host apparatus.

If an error is detected in the scanner device by the detection device of the multi-function peripheral apparatus, error information regarding the scanner device is transmitted to the host apparatus by the transmission-reception device of the multi-function peripheral apparatus. Based on the error information, a transmission-reception device of the host apparatus suspends transmission of information and data to the scanner device. The transmission-reception device of the multi-function peripheral apparatus remains able to perform transmission and reception of information and data, in accordance with an instruction from the host apparatus, even after transmitting the error information to the host apparatus. Therefore, when the host apparatus transmits information and data for the functioning image forming device, an image forming operation is performed in accordance with the instruction from the host apparatus.

In short, even if there is an error in either the scanner device or the image forming device, information and data related to the functioning device can be transmitted and received between the host apparatus and the multi-function peripheral apparatus, thereby enabling normal operation of the functioning device. Thus, this construction enables efficient use of the multi-function peripheral apparatus having a single I/O port.

According to a further aspect of the present invention, there is provided a multi-function peripheral apparatus that performs bi-directional communication with a host apparatus, and that comprises a scanner device for reading an image from a document, and an image forming device in a single body. The multi-function peripheral apparatus further comprises a detection device for detecting an error in the multi-function peripheral apparatus, and a single I/O port provided for both the scanner device and the image forming device.

The multi-function peripheral apparatus further includes a transmission-reception device for transmitting, via the I/O port, information regarding an error detected by the detection device and data read by the scanner device to the host apparatus, and for receiving information and data from the host apparatus. The transmission-reception device allows reception of a document reading request signal for the scanner device from the host apparatus, and transmits data read by the scanner device to the host apparatus, even if error information has been transmitted to the host apparatus.

Further, a control device is provided for controlling operation of the scanner device and operation of the image forming device on the basis of information from the transmission-reception device.

If an error is detected in the image forming device by the detection device of the multi-function peripheral apparatus, error information regarding the image forming device is transmitted to the host apparatus by the transmission-reception device of the multi-function peripheral apparatus. Based on the error information, a transmission-reception device of the host apparatus suspends transmission of information and data to the image forming device. The transmission-reception device of the multi-function peripheral apparatus remains able to perform transmission and reception of information and data, in accordance with an instruction from the host apparatus, even after transmitting the error information to the host apparatus. Therefore, when the host apparatus transmits information and data to the functioning scanner device, the scanner device reads an image from a document, in accordance with the instruction from the host apparatus, and the read data is transmitted to the host apparatus. In this manner, even if an error occurs in the image forming device, the scanner device can be operated normally since the scanner device is not impeded by the error, and the transmission and reception of information and data related to the scanner device between the multi-function peripheral apparatus and the host apparatus remains possible. Thus, this construction also enables efficient use of the multi-function peripheral apparatus having a single I/O port.

Furthermore, when an error occurs in the above-described multi-function peripheral apparatus, the transmission-reception device preferably transmits the content of the error as the error information. Specifically, if an error is detected by the detection device, the transmission-reception device transmits error information to the host apparatus, including information regarding the occurrence of the error and information regarding the content of the error. The content of the error is displayed by a display device of the host apparatus. This construction makes it possible to advise a user to take an appropriate action, and informs the user of the operable device or function of the multi-function peripheral apparatus. The error information may further include information as to whether or not there is an error. The operable device may be indicated by, for example, displaying the location of the error. Thus, it becomes possible to more efficiently use the multi-function peripheral apparatus having a single I/O port.

The above-described multi-function peripheral apparatus may further include a facsimile transmission-reception device. In this construction, the control device is set to control the facsimile transmission-reception device, the scanner device, the image forming device and the transmission-reception device so that: (1) information from the host apparatus is facsimile-transmitted; (2) scanning operation is performed and data thereby read is facsimile-transmitted; (3) image forming operation is performed to form an image based on facsimile-received data; or (4) facsimile-received data is transmitted to the host apparatus.

If there is an error in the scanner device, the multi-function peripheral apparatus remains able to perform facsimile transmission of information received from the host apparatus, to form an image based on facsimile-received data, and to transmit facsimile-received data to the host apparatus. If there is an error in the image forming device, the multi-function peripheral apparatus remains able to perform facsimile transmission of information received from the host apparatus, to perform scanning operation and transmit, via facsimile, the data read by scanning, and to transmit facsimile-received data to the host apparatus. Thus, the multi-function peripheral apparatus of this construction is able to perform various image input/output operations, by combining scanning operations, image forming operations and facsimile transmission-reception operations, and enables efficient use of the multi-function peripheral apparatus as described above.

A recording medium stores a control program that includes instructions for use by the controller of the host apparatus and the multi-function peripheral apparatus to perform the control procedures described above. The control program can be stored in a memory of the host apparatus in advance, for example, by the manufacturer or retailer of the host apparatus. Typically, however, the control program is provided separately, for example, on a CD-ROM or other storage media that can be purchased separately by the user (for example, with the multi-function peripheral apparatus) and subsequently stored (permanently or temporarily) to internal memory of the host apparatus. The program also can be provided to the user over a communications network such as, for example, the Internet (World Wide Web). Thus, the recording medium can be internal ROM or RAM (volatile or non-volatile), or a separate memory such as a CD-ROM, floppy disk, etc. The program can be added to the host apparatus and the multi-function peripheral apparatus internal memory as an upgrade.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

The preferred embodiments of the present invention will now be described in detail, with reference to the accompanying figures.

Figure 1:
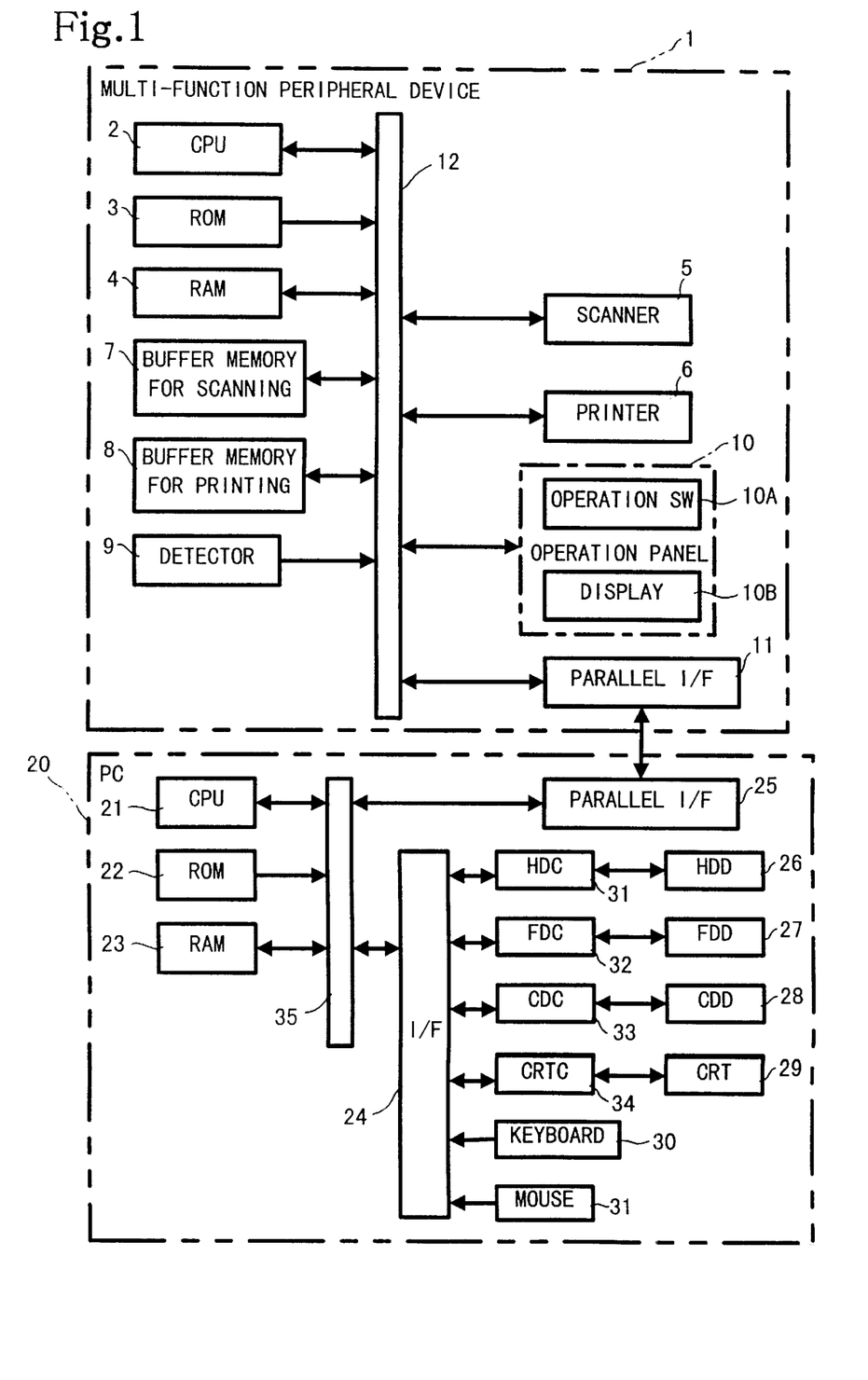
FIG. 1 is a block diagram of a control system for the image input/output system of an embodiment of this invention.

A first embodiment of the present invention will be described with reference to FIGS. 1–8. Referring first to FIG. 1, a multi-function peripheral apparatus 1 comprises a CPU 2, a ROM 3 for storing control programs, a RAM 4 for storing various printer data, e.g., color conversion data, and various scanner data, e.g., reading resolution, a scanner device 5 for reading image data from a document, a printer device 6 for printing, preferably via an inkjet method, a reading buffer memory 7 for temporarily storing image data read from a document by the scanner device 5, a print buffer memory 8 for storing printing data for the printer device 6, detector devices 9 for detecting various errors in the scanner device 5 and printer device 6, an operation panel 10 having an operational portion 10A and a display portion 10B, a data bus 12, and a bi-directional parallel interface 11 that includes an I/O port for communication with a host apparatus 20.

The scanner device 5 in this embodiment is preferably a sheet-feed type. Although not shown, the scanner device 5 is preferably made up of a reading mechanism for reading a document, a conveying mechanism for conveying a document and a motor for driving the conveying mechanism.

The printer device 6 is preferably an inkjet color printer. Although not shown, the printer device 6 is preferably made up of a printhead, a carriage for moving the printhead, a print sheet conveying mechanism and a motor for driving the carriage and the conveying mechanism.

The detector devices 9 are disposed along a plurality of locations in the scanner device 5 and the printer device 6. The detector devices 9 can include, for example, a sensor for detecting a document jam in the scanner device 5, a sensor for detecting a print sheet jam in the printer device 6, a sensor for detecting a shortage of print ink, and other sensors for detecting other operational errors.

A host apparatus 20, preferably a personal computer (PC), comprises a CPU 21, a ROM 22 for storing control programs, a RAM 23 for storing various data, an input/output interface 24 comprised of input/output ports, a data bus 35, and a bi-directional parallel interface 25 that includes an I/O port for communication with the multi-function peripheral apparatus 1.

The input/output interface 24 is connected to a hard disk drive (HDD) 26, a floppy disk drive (FDD) 27, a compact disk drive (CDD) 28, a cathode-ray tube (CRT) 29, a keyboard 30 and a mouse 31. The HDD 26, the FDD 27, the CDD 28 and the CRT 29 are connected to the input/output interface 24 via a hard disk controller (HDC) 31, a floppy disk controller (FDC) 32, a compact disk controller (CDC) 33, and a CRT controller (CRTC) 34, respectively.

The parallel interfaces 11 and 25, provided for communication between the PC 20 and the multi-function peripheral apparatus 1, are capable of bi-directional communication, thereby enabling image reading by the scanner device 5 and image output by the printer device 6 in response to instructions by the PC 20. The parallel interfaces 11 and 25 also make it possible to transmit an error signal in response to an error occurring in the scanner device 5 or printer device 6. The parallel interfaces 11 and 25 are preferably connected via a cable (not shown). However, other connection techniques may be used, e.g., a wireless optical connection.

Figure 2:
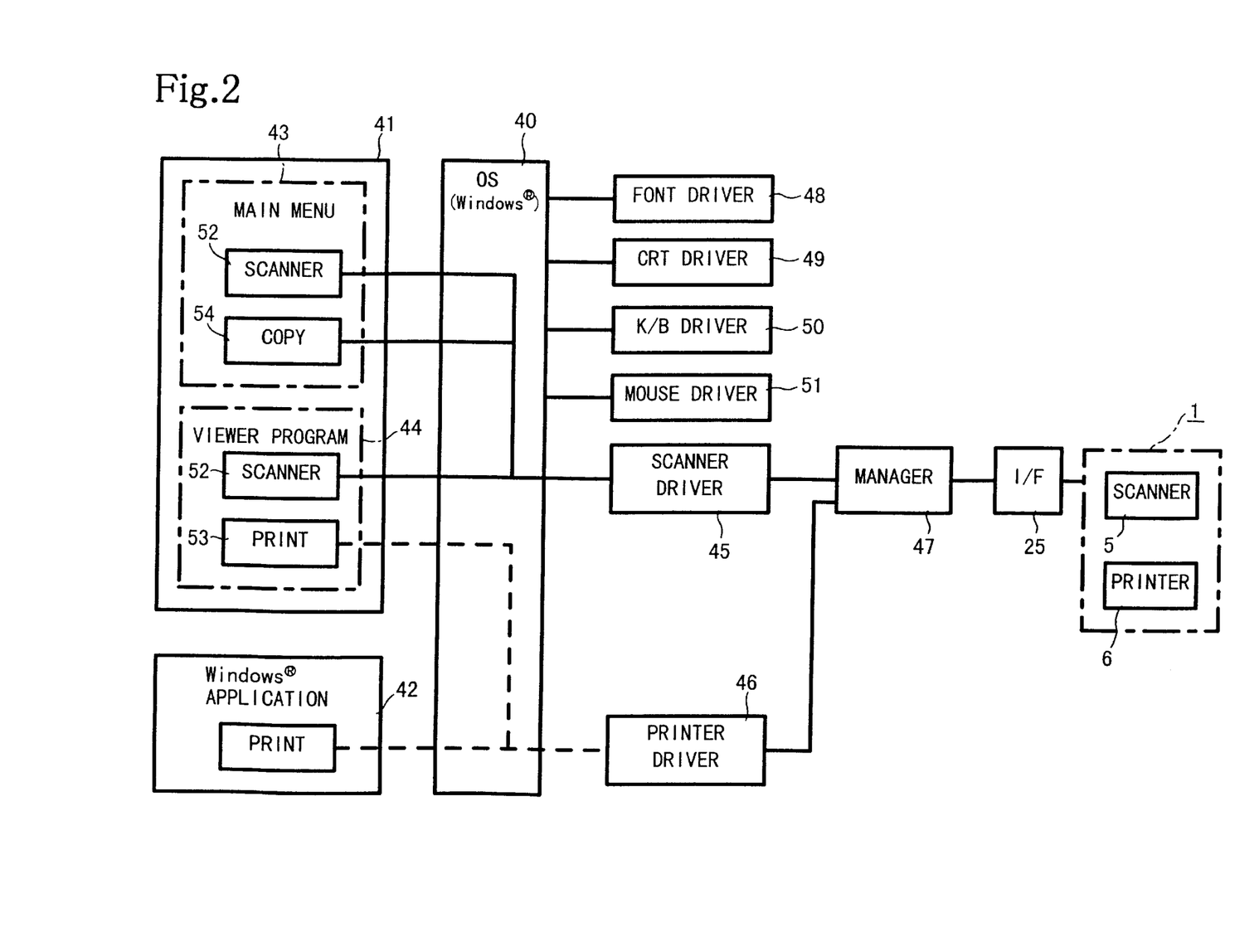
FIG. 2 is a block diagram of driver programs used with the multi-function peripheral apparatus of FIG. 1.

FIG. 2 shows the driver programs used with the multi-function peripheral apparatus 1. In the preferred embodiment, Windows® is used as an operating system (OS) 40. A main application program 41 operates on the OS 40. The main application program 41 comprises a main menu program 43 for selecting a function menu of the multi-function peripheral apparatus 1, and a viewer program 44 for displaying image data on a screen. Other application programs 42, e.g., a word processor, also operate on the OS 40.

Figure 3:
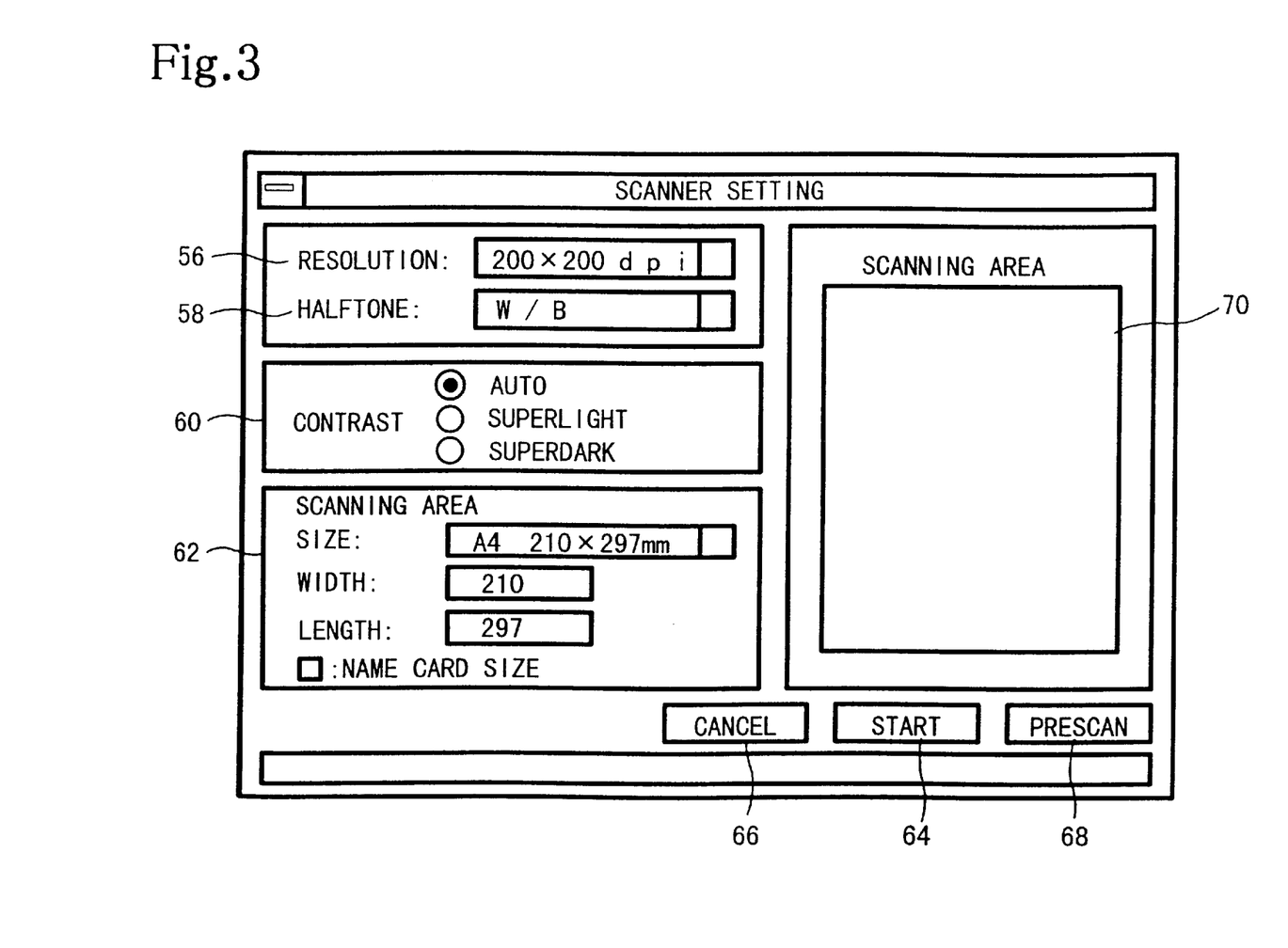
FIG. 3 shows a representative display generated by the scanner driver program shown in FIG. 2.

The main application program 41 displays a "SCAN" button on a display when either the main menu program 43 or the viewer program 44 is active. If the "SCAN" button is selected, a dialog box is displayed as shown in FIG. 3, thereby allowing a user to select settings. A user can set resolution 56, half tone 58, contrast 60 and scanning area 62. A "START" button 64 for starting scanning and a "CANCEL" button 66 for stopping scanning are also displayed.

A scanning driver program 45 is provided for displaying the items to be set on the display, and for performing a scanning operation, in response to a start instruction, based on the setting data.

During scanning, the scanner driver program 45 sends image data received from the multi-function peripheral apparatus 1 to the viewer program 44, via the parallel interface 25 and the manager program 47. The viewer program 44 displays the received image data on a display.

The scanner driver program 45 also temporarily displays the content of the image data received from the multi-function peripheral apparatus 1 when a "PRESCAN" button 68 in the dialog box is selected. Specifically, the scanner driver program 45 displays image data in a "SCANNING AREA" 70 of the dialog box shown in FIG. 3.

Furthermore, the scanner driver program 45 displays error information regarding the scanner device 5 input from the multi-function peripheral apparatus 1 via the parallel interface 25 and the manager program 47.

In the main application program 41, a "COPY" button 54 is displayed with the main menu 43, as shown in FIG. 2, for selecting a copy function that immediately prints data scanned without displaying the data. Furthermore, the viewer program 44 displays a "PRINT" button 53 for selecting a print function that first displays the image data for confirmation or image processing, and then prints the image data.

A start instruction for the copy function is preferably sent from the main menu 43 to the scanner driver program 45 in a manner similar to the sending of a scanning start instruction from the main menu 43. However, a dedicated copy driver program may also be provided separately from the scanner driver program 45. A start instruction for the print function is sent from the viewer program 44 to the printer driver program 46. The printer driver program 46 also receives error information regarding the printer device 6 transmitted from the multi-function peripheral apparatus 1, and displays the error information on a display.

The printer driver program 46 can also be started when an ordinary application program 42, e.g., a word processor, has been started. By selecting a print command or similar command on the application program 42, a print dialog box (not shown), similar to the dialog box shown in FIG. 3, is displayed to allow the setting of resolution, sheet size, color tone, etc., and to send the instruction to start printing. In short, printing operation through the printer driver program 46 can be controlled from any of the application programs 42 by selecting, in the application program's printer driver select screen, the printer driver program 46 corresponding to the multi-function peripheral apparatus 1.

Normally, the method used by the PC 20 to access an image scanner or a printer varies depending on the hardware configuration of the image scanner, the printer or the PC 20. However, it is difficult to change the access method of the application programs 41 and 42 to accommodate different hardware configurations. Accordingly, the scanner driver program 45 and the printer driver program 46 are preferably provided between the application programs 41 and 42, and the multi-function peripheral apparatus 1. Thus, access to various types of multi-function peripheral apparatus by the application programs 41 and 42 is accomplished by providing driver programs 45 and 46 that are capable of utilizing various access methods for different hardware configurations, while allowing the application programs 41 and 42 to use a fixed access method.

A font driver program 48 for controlling fonts, a CRT driver program 49 for controlling the CRT, a keyboard driver program 50 for controlling the keyboard, and a mouse driver 51 program for controlling the mouse 51 are also preferably provided for operation on the OS 40.

Further, since the multi-function peripheral apparatus 1 is equipped with the scanner device 5 and the printer device 6, and is connected to the PC 20 by a single cable, the manager program 47 is provided to manage the bi-directional communication between the scanner and printer driver programs 45 and 46, and the communication program for the multi-function peripheral apparatus 1. The manager program 47 is accessed from both the scanner driver program 45 and the printer driver program 46. The manager program 47 transmits data output from the driver programs 45 and 46 to the multi-function peripheral apparatus 1, determines the kind of data received from the multi-function peripheral apparatus 1, and distributes the received data to the scanner driver program 45 or the printer driver program 46.

The data the manager program 47 receives from the multi-function peripheral apparatus 1 includes the read data from the scanner device 5, error information regarding the scanner device 5 and the printer device 6, and information regarding the reception-ready status of the multi-function peripheral apparatus 1. Based on this information, the manager program 47 stops data transmission from the PC 20 to the multi-function peripheral apparatus 1, and displays the information on the display, thereby enabling normal scanner and printer operation.

In situations in which the printer device 6 has an error or is not ready for reception, the scanner device 5 can still be operated normally. Conversely, the printer device 6 can operate normally while the scanner device 5 has an error. Therefore, it is not necessary to completely stop the data transmission from the PC 20 to the multi-function peripheral apparatus 1.

The manager program 47 discriminates pieces of error information or reception-ready status information. Even if the scanner device 5 or the printer device 6 has an error or is in a reception-impossible state, the manager program 47 transmits data to the multi-function peripheral apparatus 1 as long as the currently instructed operation can be performed normally at both ends. The driver programs, application programs, and manager program 47 are preferably stored on the HDD 26, the FDD 27 (when a floppy disk is loaded therein), and/or the CDD 28 (when a CD is loaded therein).

Thus, the control program having instructions that causes the CPUs 2 and 21 of the multi-function peripheral apparatus and of the host apparatus to perform the processes outlined in FIGS. 4–8 can be stored in various types of recording media. For example, the control program could be stored by the manufacturer or retailer in advance to purchase by the user, for example, by storage in the hard disk. Alternatively, the control program can be stored in a CD-ROM or floppy disk for sale with the multi-function peripheral apparatus or as an after-sale upgrade, for example. As such, the control program can be subsequently stored (permanently or temporarily) in internal memory of the host apparatus and possibly of the multi-function peripheral apparatus. The program also can be provided to the user over a communications network such as, for example, the Internet (World Wide Web).

The control routines, including the control routine for transmission management by the manager program 47, will be described below with reference to the flowcharts of FIGS. 4–8.

Figure 4:
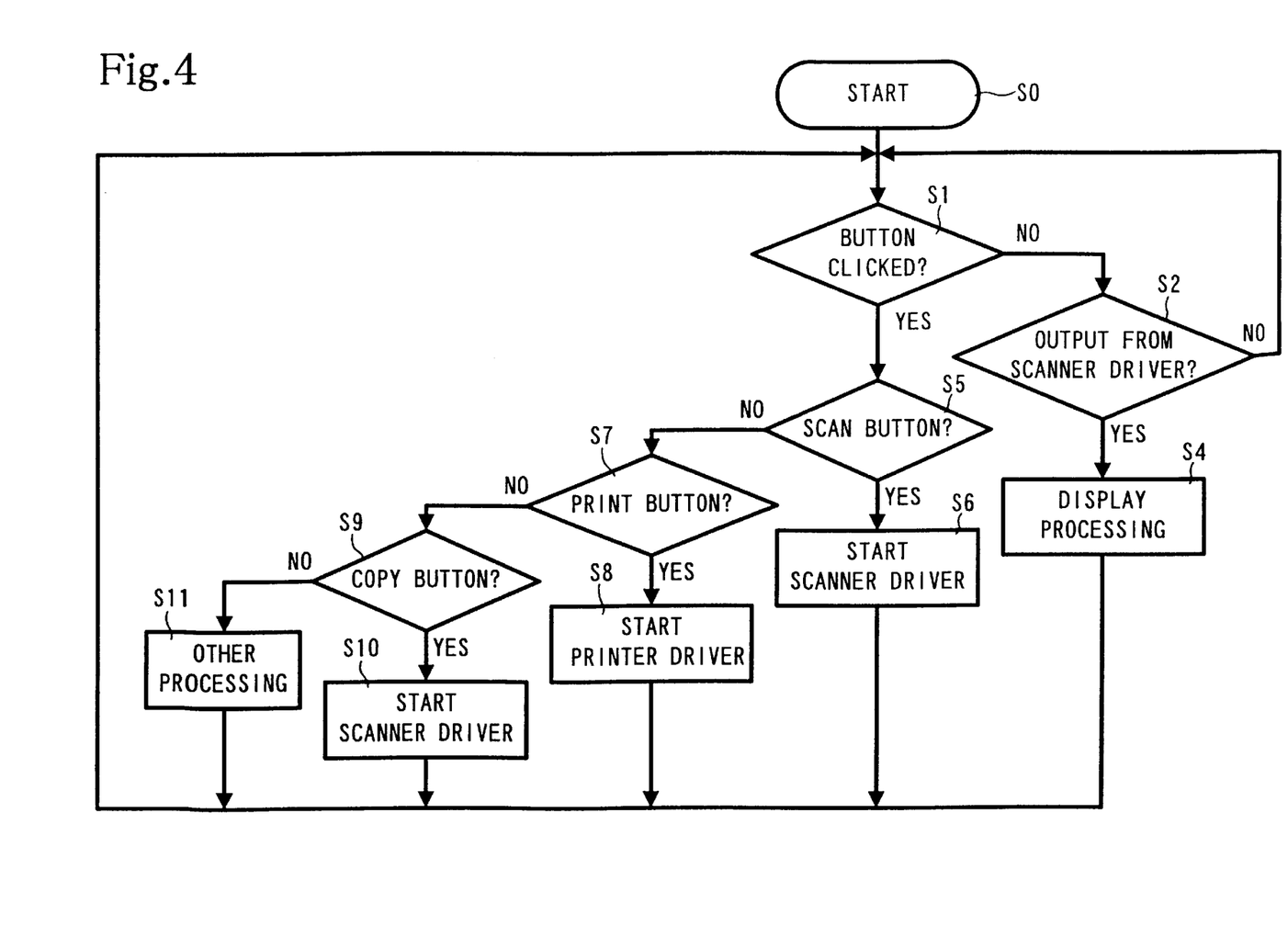
FIG. 4 is a flowchart of a preferred control routine for the application program of FIG. 2.

FIG. 4 is a flow chart of a preferred control routine for the main application program 41. The routine starts at step S0 and proceeds to step S1, where the control system determines if any button has been clicked when the main menu 43 or the viewer program 44 has been initiated. If a button has not been clicked, control continues to step S2. Otherwise, control jumps to step S5.

At step S2, the control system determines if there is an output from the scanner driver program 45. If there is not an output, control returns to step S1. Otherwise, control continues to step S4, where the control system initiates display processing to display output image data. Control then returns to step S1.

At step S5, the control system determines if a scan button has been clicked. If a scan button has been clicked, control continues to step S6. Otherwise, control jumps to step S7. At step S6, the control system starts the scanner driver program 45 to display the dialog box shown in FIG. 3. Control then returns to step S1.

At step S7, the control system determines if the print button has been clicked. If the print button has been clicked, control continues to step S8. Otherwise, control jumps to step S9. At step S8, the control system starts the printer driver program 46. Control then returns to step S1.

At step S9, the control system determines if a copy button has been clicked. If a copy button has been clicked, control continues to step S10. Otherwise, control jumps to step S11. At step S10, the control system starts the scanner driver program 45. Control then returns to step S1.

At step S11, the control system initiates processing corresponding to the type of button clicked. Control then returns to step S1.

Figure 5:
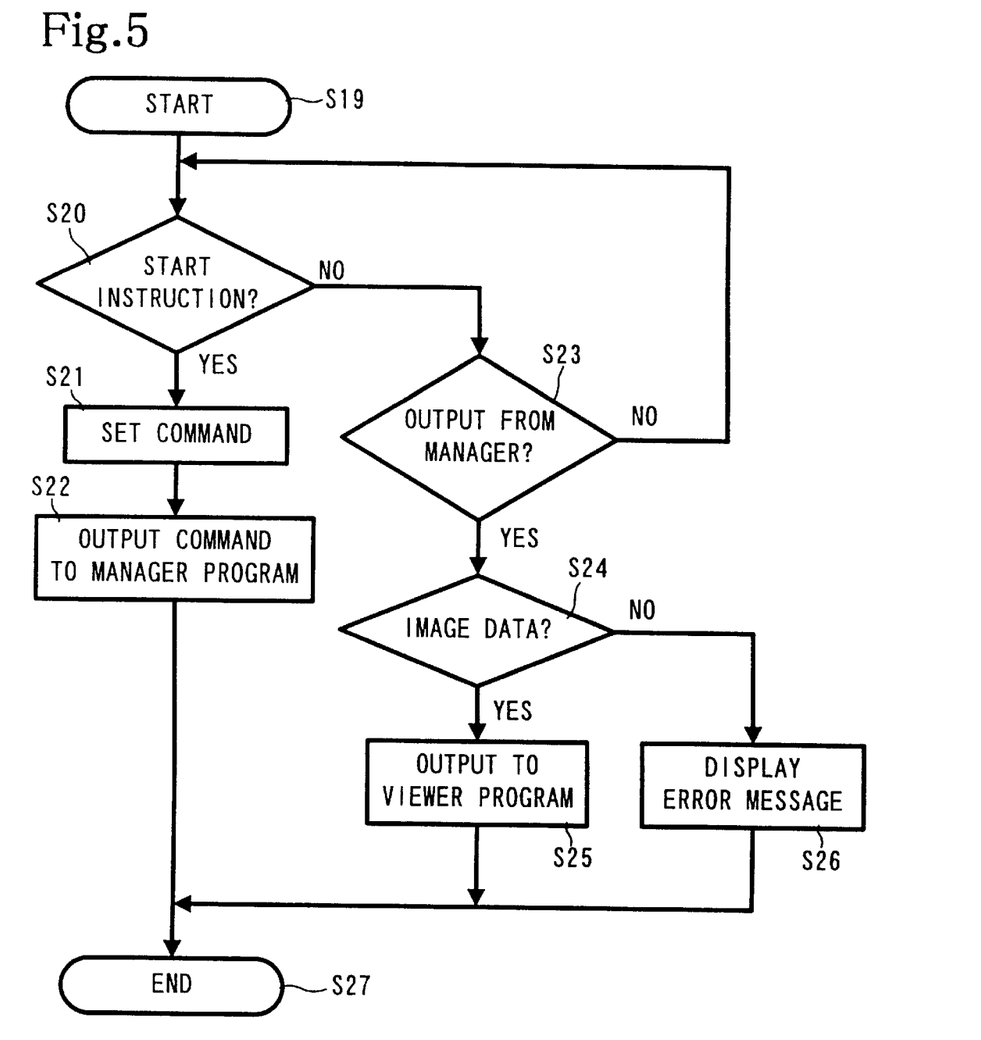
FIG. 5 is a flowchart of a preferred control routine for the scanner driver program of FIG. 2.

FIG. 5 shows of a preferred control routine for the scanner driver program 45. The routine starts at step S19 and proceeds to step S20, where the control system determines whether a start instruction has been output. If a start instruction has been output, control continues to step S21. Otherwise, control jumps to step S23.

At step S21, the control system configures a start command so that the multi-function peripheral apparatus 1 can recognize it. Next, at step S22, the control system outputs the start command to the manager program 47. Control then continues to step S27, where the control routine ends.

At step S23, the control system determines if data has been output from the manager program 47 of the multi-function peripheral apparatus 1. If data has been output, control continues to step S24. Otherwise, control returns to step S20.

At step S24, the control system determines if the data output from the multi-function peripheral apparatus 1 is image data. If the data is image data, control continues to step S25. Otherwise, control jumps to step S26. At step S25, the control system outputs the image data to viewer program 44. Control then continues to step S27.

At step S26, the control system displays an error message. Control then continues to step S27.

Figure 6:
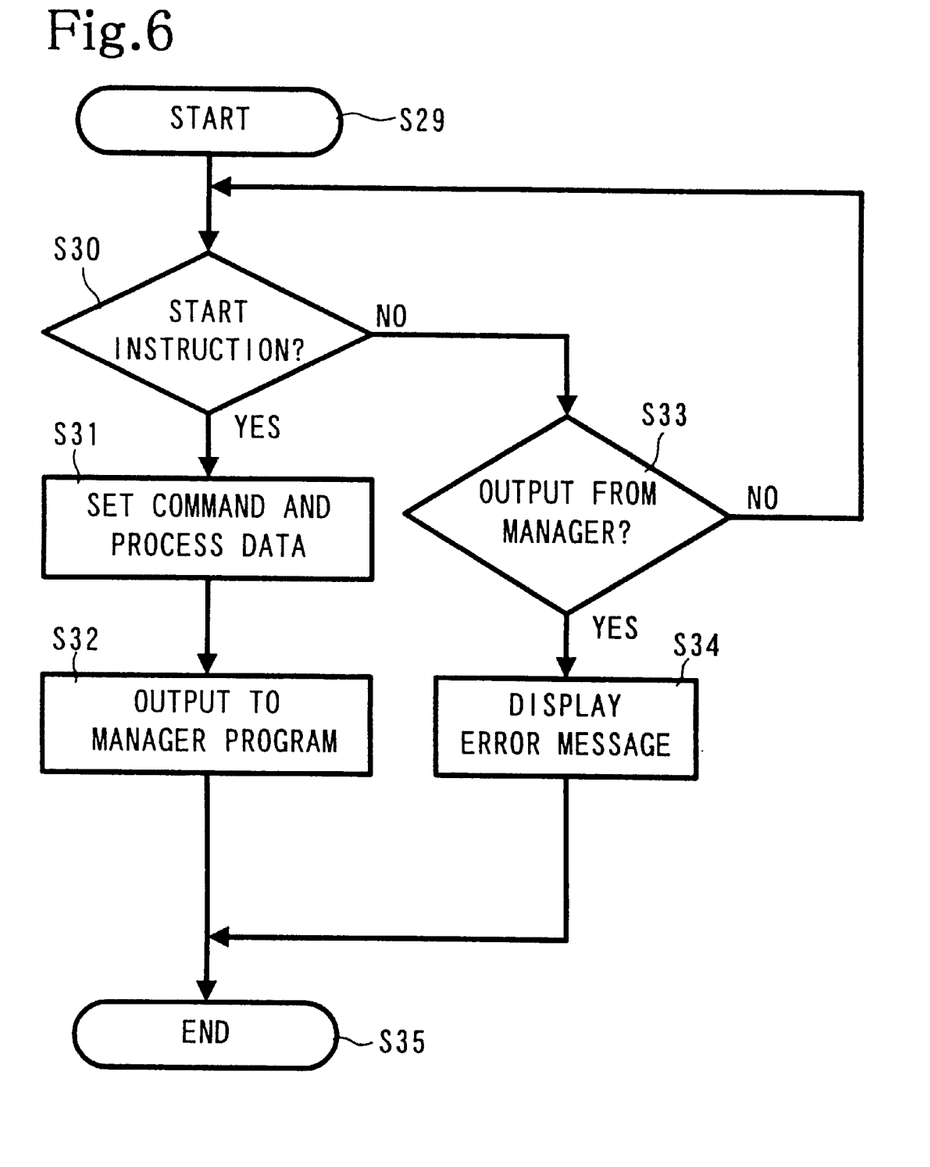
FIG. 6 is a flowchart of a preferred control routine for the printer driver program of FIG. 2.

FIG. 6 is a flowchart of a preferred control routine for the printer driver program 46. The routine starts at step S29 and proceeds to step S30, where the control system determines if a print start instruction has been output. If a print start instruction has been output, control continues to step S31. Otherwise, control jumps to step S33.

At step S31, the control system configures a start command using a control code that the multi-function peripheral apparatus 1 can recognize. The control system also converts the print data into cyan (C), magenta (M), yellow (Y), and black (B) bit image data. Next, at step S32, the control system outputs the 4-color bit image data to the manager program 47. Control then continues to step S35, where the control routine ends.

At step S33, the control system determines if data has been output from the manager program 47. If data has been output from the manager program 47, control continues to step S34. Otherwise, control returns to step S30.

At step S34, the control system displays an error message. Control then continues to step S35.

Figure 7:
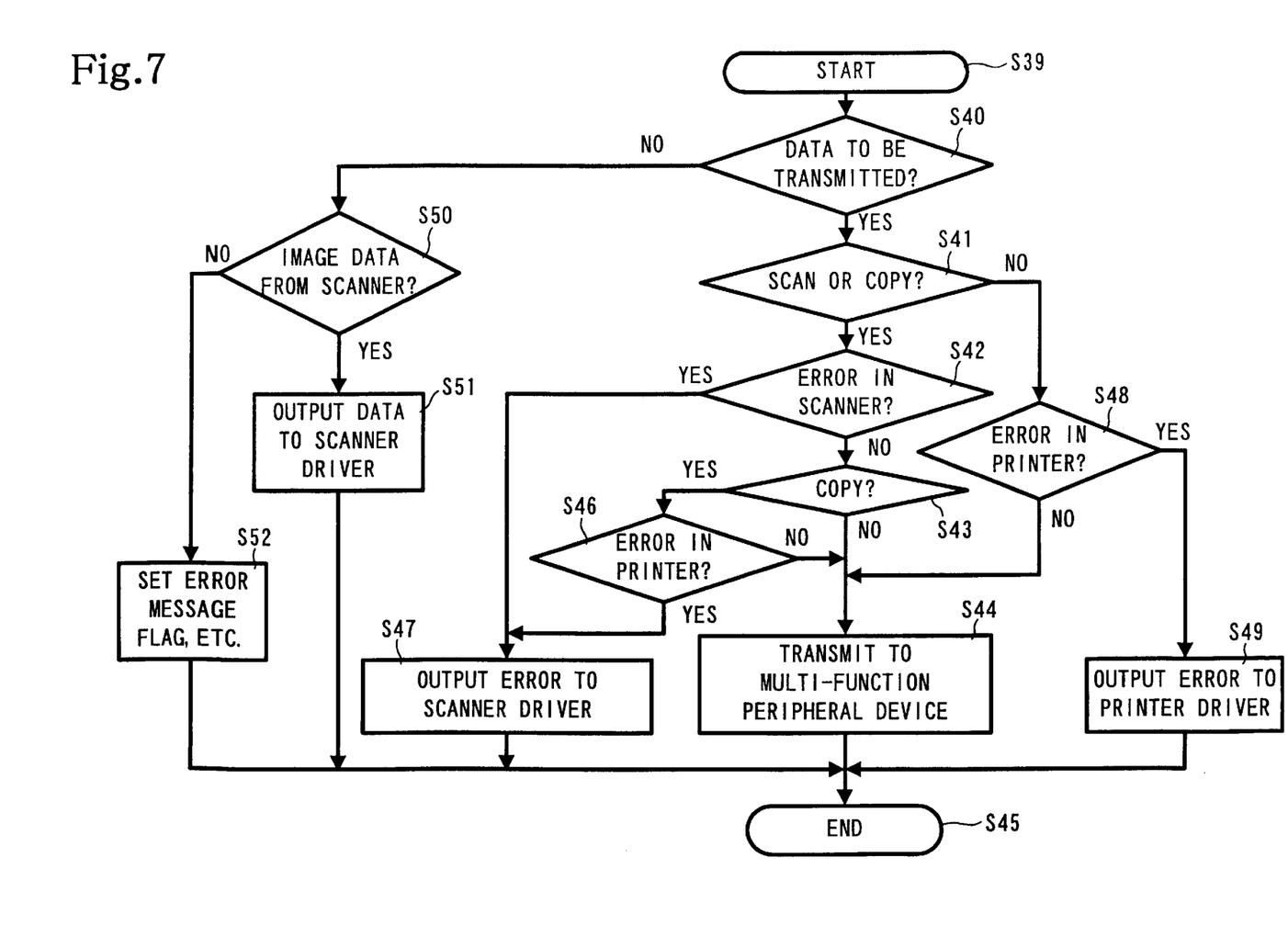
FIG. 7 is a flowchart of a preferred control routine for the manager program of FIG. 2.

FIG. 7 shows a preferred control routine for the manager program 47. The routine starts at step S39 and proceeds to step S40, where the control system determines if the received data is for transmission to the multi-function peripheral apparatus 1. If so, control continues to step S41. Otherwise, control jumps to step S50.

At step S41, the control system determines if the data to be transmitted is related to a scanning operation or a copying operation. If the data is related to a scanning or copying operation, control continues to step S42. Otherwise, control jumps to step S48. At step S42, the control system determines if there is an error related to the scanning device 5. If there is no error in the scanning device 5, control continues to step S43. Otherwise, control jumps to step S47.

At step S43, the control system determines if the data to be transmitted is related to a copying operation. If the data to be transmitted is not related to a copying operation, control continues to step S44. Otherwise, control jumps to step S46. At step S44, the control system transmits a start command to the multi-function peripheral apparatus 1. Next, at step S45, the control routine ends.

At step S46, the control system determines if there is an error related to the printer device 6. If there is an error, control continues to step S47. Otherwise, control jumps to step S44. At step S47, the control system outputs an error message to the scanner driver program 45. Control then continues to step S45.

At step S48, the control system determines if there is an error related to the printer device 6. If there is an error, control continues to step S49. Otherwise, control jumps to step S44. At step S49, the control system outputs an error message to the printer driver program 46. Control then continues to step S45.

At step S50, the control system determines if the received data is from the scanner device 5. If so, control continues to step S51. Otherwise, control jumps to step S52. At step S51, the control system outputs the image data to the scanner driver program 45. Control then continues to step S45.

At step S52, the control system sets a flag that indicates an error message. Control then continues to step S45.

Figure 8:
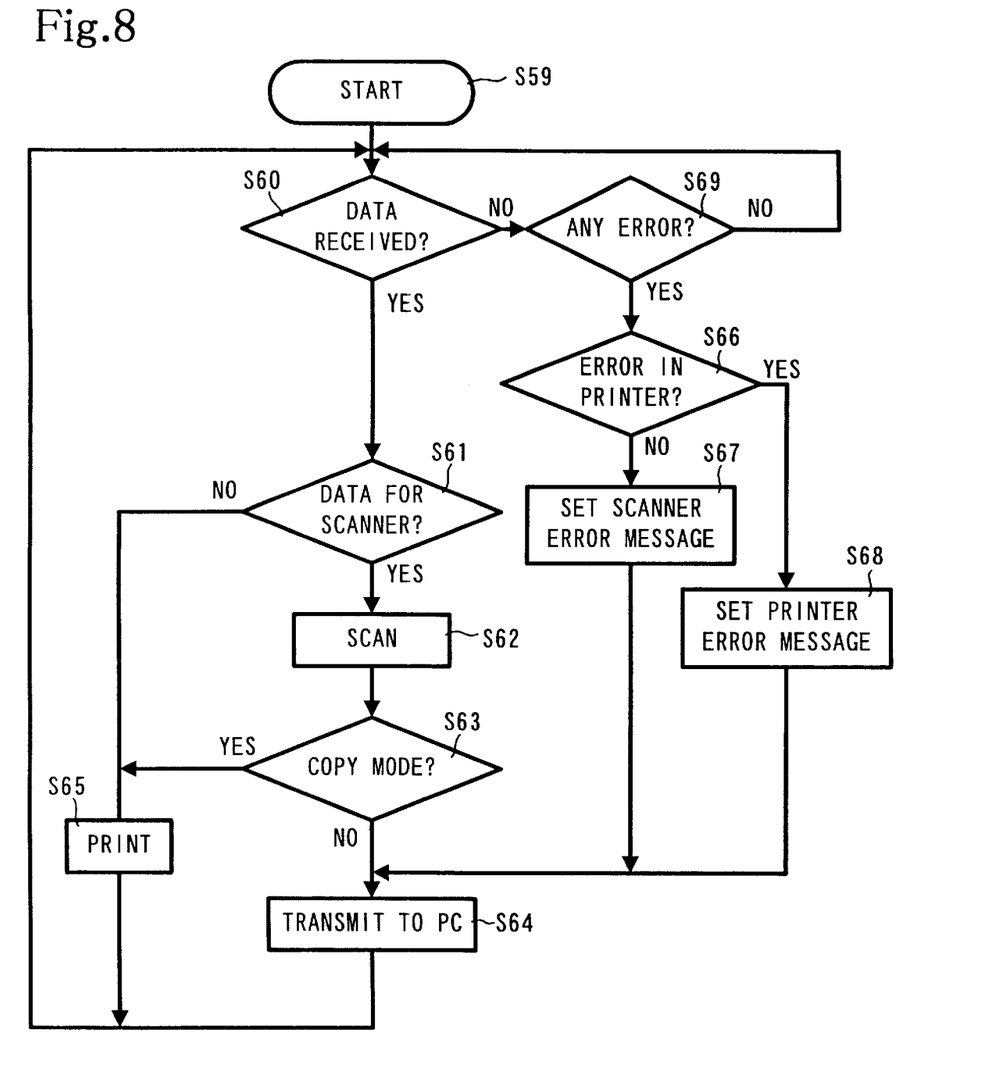
FIG. 8 is a flowchart of a preferred control routine for the multi-function peripheral apparatus of FIG. 1.

FIG. 8 shows a preferred control routine for the multi-function peripheral apparatus 1. The routine starts at step S59 and proceeds to step S60, where the control system determines if data has been received from the PC 20. If data has been received, control continues to step S61. Otherwise, control jumps to step S69.

At step S61, the control system determines if the received data is for the scanner device 5. If the received data is for the scanner device 5, control continues to step S62. Otherwise, control jumps to step S65. At step S62, the control system performs a scanning operation. Next, at step S63, the control system determines if a copy mode has been set. If not, control continues to step S64. Otherwise, control jumps to step S65. At step S64, the scanned image data is transmitted to the PC 20. Control then returns to step S60.

At step S65, the control system prints the scanned image data. Control then returns to step S60.

At step S69, the control system determines if the multi-function peripheral apparatus 1 is in an error state. If so, control continues to step S66. Otherwise, control returns to step S60.

At step S66, the control system determines if the error state is related to the printer device 6. If the error state is not related to the printer device 6, control continues to step S67. Otherwise, control jumps to step S68. At step S67, the control system sets an error message for the scanner device 5. Control then jumps to step S64.

At step S68, the control system sets an error message for the printer device 6. Control then jumps to step S64.

As is apparent from the above-described control routines, if an ordinary scanning operation alone is to be performed, determination as to whether the printer device 6 has an error is omitted. Therefore, scanning operation can be performed even if the printer device 6 has an error. That is, since an error in the printer device 6 impedes printing operation but does not impede scanning operation, scanning operation can be performed normally regardless of whether there is an error in the printer device 6. Thus, the multi-function peripheral apparatus 1 can be efficiently utilized.

However, copying operations are impeded by an error in the printer device 6, even if there is no error in the scanner device 5. Therefore, an error message is displayed if a copying operation is requested and the printer device 6 has an error.

Although the preferred embodiment has been described in conjunction with the operations performed when the main application program 41 has been started, substantially the same operations are performed when an ordinary application program 42, e.g., a word processor, has been started. For example, a printing operation can be performed even if the scanner device 5 has an error, as described above.

A second preferred embodiment of the present invention will now be described. Elements that are similar to those of the first preferred embodiment will not be described again.

In the first preferred embodiment, different error messages are output for errors in the scanner device 5 and for errors in the printer device 6. When an error occurs in the scanner device 5 or the printer device 6, the corresponding error message is output regardless of the type of error that occurs.

In the second preferred embodiment, the multi-function peripheral apparatus 1 transmits information regarding the type of error to the PC 20, and the PC 20 then determines whether to allow a scanning operation based on the type of error.

For example, although a paper jam or a paper shortage in the printer device 6 does not impede scanning operations, an open-cover error may impede both scanning operations and printing operations. Therefore, if a scanning or printing operation is requested while the cover of the multi-function peripheral apparatus 1 is open, the second preferred embodiment prevents the transmission of a start signal, and displays an error message, e.g., "COVER IS OPEN."

A third preferred embodiment of the present invention will now be described. Elements that are similar to those of the first preferred embodiment will not be described again.

In the third preferred embodiment, the multi-function peripheral apparatus 1 further comprises a facsimile device. Thus, the PC 20 is able to display received facsimile data, display scanning data, perform copying operations and perform printing operations. The third preferred embodiment can also print received facsimile data and transmit, via facsimile, data obtained by scanning or image processing on the PC 20.

If an error occurs, the multi-function peripheral apparatus 1 performs operations as described above. That is, even if the printer device 6 has an error, it is possible to display scanning operation-related data or received facsimile data on the display, and perform facsimile transmission of data obtained by scanning or image processing on the PC 20. Likewise, if the scanner device 5 has an error, it is possible to display printing operation-related data or received facsimile data on the display, print out received facsimile data, and perform facsimile transmission of data obtained by image processing on the PC 20.

Although, in the above-described embodiments, the error detecting devices 9 are provided both in the scanner device 5 and in the printer device 6, the present invention is not limited to that configuration. For example, the error detecting devices 9 may be provided only in the printer device 6. This modified configuration is suitable for a multi-function peripheral apparatus 1 that employs a scanner device other than a sheet-feed-type scanner because, in a non-sheet-feed-type scanner device, errors rarely occur.

When the detector devices 9 are provided only in the printer device 6, the multi-function peripheral apparatus 1 transmits error information related only to the printer device 6 to the PC 20. Thus, the manager program 47 can immediately transmit a scanning operation start signal to the multi-function peripheral apparatus 1 without having to determine whether there is an error in the multi-function peripheral apparatus 1. Therefore, scanning operation can be performed normally even if the printer device 6 has an error.

Although the above-described embodiments have been described in conjunction with multi-function peripheral apparatus that employ an inkjet-type printer, the present invention is not limited to such a configuration. The multi-function peripheral apparatus 1 may also employ other types of printers, e.g., an electrophotographic printer.

A fourth preferred embodiment of the present invention will now be described. Elements that are similar to those of the first preferred embodiment will not be described again.

In the first preferred embodiment, if there are errors in the scanner device 5 and/or the printer device 6, the manager program 47 receives error messages from the multi-function peripheral apparatus 1, and sets flags indicating the error messages. Subsequently, when an operation is requested, the manager program 47 determines whether there is an error in the scanner device 5 or the printer device 6 based on the error flags. However, the present invention is not limited to this configuration. For example, the manager program 47 may be designed to send an inquiry to the multi-function peripheral apparatus 1 regarding the present error condition when a start is initiated.

Furthermore, in the first preferred embodiment, the scanner driver program 45 or the printer driver program 46, in response to an error message, opens an error message window and displays an error message therein to indicate the type of error that has occurred during waiting or during operation. However, it is also possible to transmit an error message to the main menu 43 or the viewer program 44 so that the error message is displayed on a screen of the main menu 43 or the viewer program 44.

As shown in FIG. 1, the control system for the image input/output system of this invention is preferably implemented using a programmed microprocessor or micro controller and peripheral integrated circuit elements. However, the control system can also be implemented using an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowcharts shown in FIGS. 4–8 can be used to implement the control system.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and the scope of the invention as defined in the following claims.

What is claimed is:

1. A combination of a host apparatus and a multi-function peripheral apparatus, comprising:
    a printer device in the multi-function peripheral apparatus for printing data from the host apparatus;
    a scanner device in the multi-function peripheral apparatus for scanning an image of a document;
    status means in the multi-function peripheral apparatus, by itself, checking operational status of the printer device and the scanner device and transmitting error messages to the host apparatus when the status means has detected the error status of at least one of the printer device and the scanner device; and
    a manager in the host apparatus that transmits an instruction to the multi-function peripheral apparatus to operate the printer device and the scanner device, the manager device storing error messages when the host apparatus receives the error messages from the status means, wherein the manager determines only whether an error message for the printer device is stored therein when the manager receives an instruction related to the printer device from the host apparatus, and the manager determines only whether an error message for the scanner device is stored therein when the manager receives an instruction related to the scanner device from the host apparatus, so that the manager operates the instructed one of the printer device and the scanner device to execute a task if the instructed one of the printer device and the scanner device is available upon receipt of the instruction to operate regardless of the status of the other, non-instructed device.

2. The combination according to claim 1, wherein the manager determines only whether an error message for the printer device is stored therein only when the manager receives an instruction related to the printer device from the host apparatus, and the manager determines only whether an error message for the scanner device is stored therein only when the manager receives an instruction related to the scanner device from the host apparatus.

3. The combination according to claim 1, wherein the host apparatus comprises:
    a printer driver that transmits an instruction for operating the printer device to the manager; and
    a scanner driver that transmits an instruction for operating the scanner device to the manager,
    wherein the manager transmits error messages to the printer driver only when the manager receives an instruction from the printer driver and determines that the error message for the printer device is stored therein, and the manager transmits an error message to the scanner driver only when the manager receives an instruction from the scanner driver and determines that the error message for the scanner device is stored therein.

4. The combination according to claim 3, wherein the host apparatus comprises a display device, and wherein the printer driver displays the error message for the printer device on the display device when the printer driver receives the error message from the manager, and the scanner driver displays the error message for the scanner device on the display device when the scanner driver receives the error message from the manager.

5. The combination according to claim 1, further comprising a facsimile device in the multi-function peripheral apparatus that communicates data with a remote facsimile device.

6. A combination of a host apparatus and a multi-function peripheral apparatus, comprising:
    a printer device in the multi-function peripheral apparatus for printing data from the host apparatus;
    a scanner device in the multi-function peripheral apparatus for scanning an image of a document;
    status means in the multi-function peripheral apparatus, by itself, checking operational status of the printer device and the scanner device and transmitting error messages to the host apparatus when the status means has detected the error status of at least one of the printer device and the scanner device; and
    a manager in the host apparatus that transmits an instruction to the multi-function peripheral apparatus to operate the printer device and the scanner device, the manager device storing error messages when the host apparatus receives the error messages from the status means, wherein the manager determines only whether an error message for the printer device is stored therein only when the manager receives an instruction related to the printer device from the host apparatus, and the manager determines only whether an error message for the scanner device is stored therein only when the manager receives an instruction related to the scanner device from the host apparatus, so that the manager operates the instructed one of the printer device and the scanner device to execute a task if the instructed one of the printer device and the scanner device is available upon receipt of the instruction to operate regardless of the status of the other, non-instructed device.

7. A combination of a host apparatus and a multi-function peripheral apparatus, comprising:
    at least two devices in the multi-function peripheral apparatus, each device of the at least two devices having a different function than a function of any other device of the at least two devices;
    status means in the multi-function peripheral apparatus, by itself, checking operational status of each device of the at least two devices and transmitting error messages to the host apparatus when the status means has detected the error status of at least one of the at least two devices; and
    a manager in the host apparatus that transmits an instruction to the multi-function peripheral apparatus to operate the at least two devices, the manager device storing error messages when the host apparatus receives the error messages from the status means, wherein the manager determines only whether an error message for one of the at least two devices is stored therein when the manager receives an instruction related to the corresponding device from the host apparatus, and the manager determines only whether an error message for the other one of the at least two devices is stored therein when the manager receives an instruction related to the other corresponding device from the host apparatus, so that the manager operates the one of the at least two devices to execute a task if the one of the at least two devices is available upon receipt of the instruction to operate regardless of the status of the other device.

8. The combination according to claim 7, wherein the manager determines only whether an error message for the one of the at least two devices is stored therein only when the manager receives an instruction related to the corresponding device from the host apparatus, and the manager determines only whether an error message for the other one of the at least two devices is stored therein only when the manager receives an instruction related to the other corresponding device from the host apparatus.

9. A combination of a host apparatus and a multi-function peripheral apparatus, comprising:

at least two devices in the multi-function peripheral apparatus, each device of the at least two devices having a different function than a function of any other device of the at least two devices;

status means in the multi-function peripheral apparatus, by itself, checking operational status of each device of the at least two devices and transmitting error messages to the host apparatus when the status means has detected the error status of at least one of the at least two devices; and a manager in the host apparatus that transmits an instruction to the multi-function peripheral apparatus to operate the at least two devices, the manager device storing error messages when the host apparatus receives the error messages from the status means, wherein the manager determines whether an error message for one of the at least two devices is stored therein only when the manager receives an instruction related to the corresponding device from the host apparatus, and the manager determines whether an error message for the other one of the at least two devices is stored therein only when the manager receives an instruction related to the other corresponding device from the host apparatus, so that the manager operates the one of the at least two devices to execute a task if the one of the at least two devices is available upon receipt of the instruction to operate regardless of the status of the other device.

* * * * *